United States Patent [19]

Linaberry et al.

[11] 3,973,047

[45] Aug. 3, 1976

[54] PROCESS OF DEHYDRATING VEGETABLES

[75] Inventors: Jack R. Linaberry; John A. Frane, both of Modesto, Calif.

[73] Assignee: General Foods Corporation, White Plains, N.Y.

[22] Filed: Apr. 18, 1974

[21] Appl. No.: 461,830

Related U.S. Application Data

[63] Continuation of Ser. No. 316,802, Dec. 20, 1972, abandoned, which is a continuation of Ser. No. 26,069, April 6, 1970, abandoned.

[52] U.S. Cl. .............................. 426/473; 426/521; 426/456
[51] Int. Cl.² ...................... A23B 7/02; A23B 7/06
[58] Field of Search ........... 426/511, 521, 443, 465, 426/473, 456; 127/43

[56] References Cited
UNITED STATES PATENTS

| | | | |
|---|---|---|---|
| 2,619,424 | 11/1952 | Masure | 426/521 X |
| 2,754,233 | 7/1956 | Owens | 127/43 |
| 2,895,836 | 7/1959 | Lazar et al. | 426/521 X |
| 3,630,747 | 12/1971 | Lowe et al. | 426/521 X |

OTHER PUBLICATIONS

Cruess, *Commercial Fruit & Vegetable Products*, 3rd ed., pp. 508–511.

*Primary Examiner*—S. Leon Bashore
*Assistant Examiner*—Arthur L. Corbin
*Attorney, Agent, or Firm*—Bruno P. Struzzi; Thomas V. Sullivan; Michael J. Quillinan

[57] ABSTRACT

Vegetable or vegetable pieces are subjected to partial dehydration with hot air to a moisture content less than about 30% and are thereafter contacted with a hot humid gaseous medium (preferably air) having a dry bulb temperature from about 140°F to about 200°F and a wet bulb temperature from about 120°F to about 180°F for a time period less than 12 minutes such that bacteria levels in the vegetables are reduced without adversely affecting other quality attributes, i.e. color, flavor, texture and without causing heat damage to the vegetables. The thusly contacted, partially dehydrated vegetables are then further dehydrated with hot air so as the reduce the moisture content of the vegetables to less than about 8%.

14 Claims, No Drawings

PROCESS OF DEHYDRATING VEGETABLES

This is a continuation of application Ser. No. 316,802 filed Dec. 20, 1972, now abandoned, which is a continuation of Ser. No. 26,069 filed Apr. 6, 1970 now abandoned.

This invention relates to a process of dehydrating vegetables. More particularly, this invention is concerned with a process of preparing dehydrated vegetables which are substantially free from microbiological organisms when compared with vegetables processed and dehydrated by current commercial means. Still more particularly, this invention has reference to a process of reducing the level of microbiological organisms in dehydrated vegetables.

BACKGROUND OF THE INVENTION

Conventional methods of preparing dehydrated vegetables such as carrots, bell peppers, spinach, cabbage, asparagus, celery, beans, beets, onions, etc. generally involve washing, trimming and/or peeling the vegetables; cutting or slicing or dicing the vegetables; partially precooking the vegetables by blanching them with steam or hot water; treating the vegetables with a preservative; partially drying the vegetables at temperatures of from about 120°F. to about 300°F., generally 130°F. to 250°F., and finish drying the vegetables at lower temperatures until a moisture content of less than about 5 to 10% is reduced. The vegetables so produced have been widely accepted by the food industry as ingredients for use in preparing soups, stocks, casseroles, and the like. However, these dehydrated vegetable products sometimes may be outside of the rigid specifications set by the food processor and consumer regarding microbiological contamination. Relatively high bacteria counts frequently associated with dehydrated vegetables when compared with vegetables preserved by other means such as, for example, freezing, are due in part to the 5-fold to 20-fold concentration effect resulting from the removal of water. In addition, the large-scale processing of a variety of vegetables from many sources in the fields and farms may frequently present serious problems in quality control for a dehydrated vegetable facility. While certain sterilization, preservation and treatment methods for lowering bacteria counts have been and are in use, difficulty is often encountered in carrying out these methods to such an extent as to achieve substantially microbiological-free dehydrated vegetable products without drastically affecting quality, color, flavor, and texture of the finished products. For example, many vegetables are not blanched and many require relatively low temperature, long drying times where conditions for any sort of a "kill" are simply not present. Blanching alters the texture of some vegetables and frequently inhibits drying. High drying temperatures (and faster drying times) are practical for a few products, but many are heat sensitive with color and flavor adversely affected. Chemical treating agents such as sulfite dips and the like may be employed, yet it frequently happens that color, flavor and texture of the dehydrated vegetable products are impaired and residues of such agents may be left which are objectionable thereby making the products wholly unacceptable. Gas sterilization, although effective, is expensive, requires remoistening and redrying and is not approved for vegetables at the present time.

Terminal heat treatment of dry vegetables with steam is a fairly recent and promising development and such method is described and claimed in copending application Ser. No. 426,420, filed Dec. 19, 1973, which is a continuation of Ser. No. 122,133, filed Mar. 8, 1971, now abandoned, which is a continuation of Ser. No. 695,568, filed Jan. 4, 1968, now abandoned in which one of us is also a joint inventor and which is assigned to the assignee of the present application. However, such method requires a redrying step and plant drying capacity may not always be adequate.

SUMMARY OF THE INVENTION

It is an object of this invention to produce dehydrated vegetables which are substantially free of microbiological contamination.

It is a further object of this invention to produce dehydrated vegetables having significantly reduced counts of bacteria and other microorganisms without materially altering other quality factors such as color, flavor and texture and ease of rehydration.

It is a still further object of this invention to provide a process for preparing dehydrated vegetables with minimal levels of bacteria and other microbes.

It is yet another object of this invention to provide a process for preparing dehydrated vegetables with minimal levels of bacteria which will not affect product recovery and can be made an integral part of commercial continuous dehydration equipment at nominal expense.

It has been discovered that if vegetables or vegetable pieces are subjected to a critical sequence of processing conditions during dehydration, products having extremely low levels of bacteria and other microbiological contaminants are obtained. However, other desirable and desired quality features of the finished dehydrated vegetable products do not appear to be noticeably affected thereby.

Our unique process involves contacting vegetables which may be previously cut or otherwise subdivided into pieces with a hot, humid drying medium under controlled conditions, as an integral step during conventional hot air dehydration, such that the product temperature is raised sufficiently high to reduce bacteria levels without adversely affecting other quality attributes, i.e. color, flavor, texture. The hot humid drying medium is preferably air but other gases such as, for example, nitrogen, carbon dioxide and the like and mixtures may be employed. The partially dried product temperature is increased to approximately the circulating air wet bulb temperature or slightly higher, which would be sufficiently high to kill bacteria under the relatively humid conditions which will not cause significant dehydration (and evaporative cooling) or significant condensation.

In carrying out the process, the vegetables or vegetable pieces are first exposed to elevated air temperatures for a period of time until they are dried to a moisture content of approximately 8 to 50% and preferably in the 10 to 30% range. Then, the partially dehydrated vegetables or vegetable pieces are subjected to a drying type operation in which the dry bulb/wet bulb conditions are controlled. During this operation or step, the vegetables or vegetable pieces are contacted with air having dry bulb/wet bulb temperatures, expressed herein as "°F. d.b./°F. w.b.", ranging from about 200°F. d.b./180°F. w.b. to about 140°F. d.b./120°F. w.b. For most vegetables the preferred range is from about 170°F. d.b./150°F. w.b. to about 150°F. d.b./130°F. w.b. The exposure time will be in the range of 3 to 20 minutes and preferably in the 5 to 12 minute range. Following this step, which we call "humid air pasteurization", the vegetables are conventionally dried to a final moisture content of less than about 8%.

Lazar et al. in U.S. Pat. Nos. 2,895,836 and 2,979,412 describe methods for preparation of dehydrated fruit in which an intermediate processing step is utilized between a partial dehydration step and a final dehydration step. Thus, in the method of of U.S. Pat. No. blanching by means of steam or a steam/air mixture is employed. However, this intermediate step between the initial and final drying step is for the express purpose of inactivating the enzymes of the partially dehydrated fruit and eliminating the need for sulfite treatment. It is apparent that a blanching treatment requires additional equipment and higher temperatures (175°F. to 212°F.); such disadvantages are not present in the process of this invention. In the later U.S. Pat. No. 2,979,412, a somewhat related intermediate step between partial and final drying step is disclosed. There, the partially dehydrated fruit is contacted with live steam for a period of 2 to 6 minutes. It would appear that the method is principally directed toward obtaining dehydrated fruit which have a color, appearance and texture of sun-dried fruit. By contrast, the process of this invention results in dehydrated vegetables having the desirable attributes of color, appearance, texture, and ready rehydratability (and otherwise comparable to untreated vegetable products) and also the quality of being substantially free of bacterial and microbiological contamination, the latter characteristics being not disclosed by Lazar et al.

U.K. patent specification No. 1,084,714 also deals with the dehydration of foodstuffs and, more particularly, vegetables and certain grains. In the process described, at least part of the dehydration process is carried out by contacting the foodstuff with a gas, as for example air, containing from 5 to 50% by weight of water vapor at a temperature of about 195°F. to 425°F. It is apparent that the process of the U.K. specification is directed toward "puffing" vegetables and certain grains especially when the operating temperatures, all of which are above the boiling point of water, are noted. The process of the present invention is, therefore, contrasted with that of the U.K. specification in that excessively high temperatures are not suitable for use in the dehydration process and are purposely avoided so as to avoid heat damaging the product.

The present invention is, therefore, seen to offer a means of producing wholesome, good quality, dehydrated vegetables substantially free of bacterial and other microbiological contamination but without necessitating the use of blanching or steaming techniques as part of the dehydration process and also without requiring excessively high temperatures during drying.

Among the more significant advantages of our invention are the following features of the process which:

will reduce bacteria and other microbe levels in conventionally dehydrated vegetables without significant heat damage or other adverse quality effects;

can easily be incorporated in existing dryer designs;

does not depend on blanching, pre-cooking or excessive drying temperatures;

does not depend on gases or any chemical additives which might become part of the final product;

does not add to the drying load or compromise dryer efficiency;

can be applied near the end of the dehydration system, minimizing opportunities for recontamination or bacteria growth.

DESCRIPTION OF THE PREFERRED EMBODIMENTS

By using the particular sequences of processing steps of this invention during dehydration, the vegetable product temperatures may approach the circulating air dry bulb temperatures employed, a phenomenon which does not normally occur during conventional hot air dehydration methods. At the same time, however, the humid conditions prevailing, i.e. those brought about by control of wet bulb temperatures, serve to minimize levels of bacteria and other microbes and tend to offset any heat damage and product quality deterioration. The effect observed appears to be one of sterilization or pasteurization and results in markedly reduced levels of aerobic bacteria and/or other microbiological contaminants including coilform, E. coli as well as yeasts, molds and the like, the presence of which can affect the storageability, acceptability, and quality of dehydrated vegetable products.

The humid air pasteurization step may be integrated into conventional vegetable dehydration processes usually just before the final dehydration stage of such processing. Alternatively, the process of this invention may be utilized as a reprocessing method on lots of dehydrated vegetables whose maximum microorganisms specification limits are exceeded.

In all cases, the objective is to bring the vegetable product temperature, or at least the product surface temperature, to approximately 140°F. or above while maintaining a moisture level present in the vegetable product sufficient to realize a bacteria kill without resorting to excessive temperatures. Depending on the moisture content of the vegetable product entering the treatment zone and the particular dry bulb/wet bulb conditions employed, some slight additional dehydration or some slight equilibration to a higher moisture may occur. In general, the vegetable product tends toward a moisture content in equilibrium with the pasteurizing medium. As disclosed by the accompanying examples, product moisture reduction (expressed as a weight percent of the product just before and after decontamination by humid air pasteurization) may range upwardly to 12%, although as indicated herein substantially no such dehydration may occur depending upon initial moisture content and dry and wet bulb thermometry, the specified extent of dehydration as a result of said pasteurization thus ranging between 0% – 12%.

Application of humid air pasteurization conditions too early in the drying process, while effective in reducing bacteria, may alter other quality characteristics and may promote reactions which adversely affect the vegetable product. Consequently, the humid air pasteurization step generally immediately precedes a final dehydration step.

Further, the application of the humid air pasteurization conditions to raise the vegetable product temperature sufficiently high enough to kill bacteria must not be overly extended. The elevated temperature to which the product is increased must be quickly reduced to avoid heat damaging effects. This is conveniently accomplished by bringing the partially dehydrated product from the hot humid air zone immediately into a conventional drying zone at a lower humidity and lower wet bulb temperature. The resultant evaporative cooling effect quickly reduces the vegetable product temperature to a tolerable level.

In carrying out the process of this invention, vegetables which are preliminarily prepared for dehydration by steps including washing, trimming and/or peeling; cutting or slicing or dicing; and partial precooking, if desired, are contacted with a drying medium such as air in a heated drying chamber. This is generally carried out in commercially available types of apparatus such as forced air dehydrators of the tunnel, tray and continuous belt type. The temperature of the air may range from about 130°F. to about 250°F. with the higher temperatures employed during the first part of the drying cycle depending upon the nature of the vegetable product being partially dried, the types of the product within the drying apparatus and the retention time of the product therein. Then, drying conditions within the apparatus are adjusted so as to provide dry bulb/wet bulb temperatures ranging from 200°F. d.b./180°F. w.b. to 140°F. d.b./120°F. w.b. for a period of 5 to 20 minutes. Of course, the vegetable product to be treated and dehydrated may be introduced into auxiliary drying equipment for the carrying out of this step of the process. Generally, however, it is desired to conduct the humid air pasteurization step as part of the overall dehydration process employing the same equipment. Lastly, the vegetable or vegetable pieces are subjected to a final dehydration step employing temperatures ranging from about 110°F. to 160°F. for a period of time which is effective to reduce the moisture content of the finished product to below about 8%.

Among the many vegetables which can be effectively treated by the process of this invention are bell peppers, asparagus, spinach, celery, onions and green beans. However, the process is also suitable for use with other seed and pod vegetables, fruiting vegetables, leafy vegetables as well as with root crop vegetables.

In order to further illustrate the present invention, the following nonlimiting examples are given.

EXAMPLE I

Green bell pepper dice were treated in solution containing sodium sulfite, sodium bicarbonate and salt and dried in a through circulation dryer at 140°F. to a moisture content of 28%. Conditions in the dryer were changed to provide 100% recirculation of air to which was added a mixture of steam and water so as to maintain 170°F. d.b./150°F. w.b. conditions (18% H$_2$O, 60% Relative Humidity). This humid air treatment was continued for 10 minutes with actual product temperature rising to 155°F. and product moisture dropping to 18%. Product was finish dried at 130°F. to 5% moisture.

A control sample was processed and dried under identical conditions except that the humid air treatment (the humid air pasteurization step) was omitted. Bacteria results were as follows:

|  | Humid Air Treated (according to the process of this invention) | Control |
| --- | --- | --- |
| Before treatment- Standard Plate Count/gram Coliform/gram After treatment- | 1,300,000 8,000 | 1,100,000 4,000 |
| Standard Plate Count/gram Coliform/gram Finished Product- | 20,000 1,000 | — |
| Standard Plate Count/gram Coliform/gram | 14,000 40 | 270,000 200 |

EXAMPLE II

Fresh asparagus was washed and trimmed to remove butt end and diced ⅜ × ⅜ × 3/16 inch. The diced product was dried in a through circulation dryer using 145°F. air initially and finish dried at 130°F. A second sample was processed in a similar manner except that when the average product moisture was reduced to approximately 19%, the product was subjected to a humid air treatment at 170°F. d.b./150°F. w.b. for 10 minutes. At the conclusion of the treatment step the moisture content was approximately 14% and the product was finish dried at 130°F. to less than 4% moisture.

Bacteria results on duplicate samples were:

|  | Humid Air Treated | Control |
| --- | --- | --- |
| Standard Plate Count/gram | 1,000 4,000 | 7,300,000 2,100,000 |
| Coliform/gram | <40 <40 | 14,000 500 |

EXAMPLE III

Partially dehydrated spinach at approximately 23% moisture which had been washed, trimmed, diced and sulfite treated was taken from a belt dryer where it had been dried at temperatures ranging from 200°F. to 150°F. The partially dehydrated spinach was subjected to a range of humid air pasteurization conditions in a dryer ranging from 170°F. d.b./150°F. w.b. to 140°F. d.b./120°F. w.b. for 10 minutes. Product moisture after treatment was approximately 20% and the product was finish dried at 130°F. Control samples were also taken from the belt dryer and finish dried at 130°F.

Bacteria results were:

|  | Standard Plate Count/gram | Coliform/ gram | E.coli |
| --- | --- | --- | --- |
| Control | 200,000 | 54,000 | + |
| Humid Air Treated (170°F. d.b./150°F. w.b.) | 3,000 | <40 | — |
| Control | 18,000 | 700 | + |
| Humid Air Treated (160°F. d.b./140°F. w.b.) | 3,000 | <40 | — |
| Control | 16,000 | 4,000 | — |
| Humid Air Treated (150°F. d.b./130°F. w.b.) | 5,000 | <40 | — |
| Control | 75,000 | 27,000 | + |
| Humid Air Treated (140°F. d.b./120°F. w.b.) | 13,000 | <40 | — |

EXAMPLE IV

Partially dried cross cut celery slices ⅛ inch which had been washed, trimmed, sliced and sulfite treated were removed from the third stage of a five stage belt dryer. The partially dried product was subjected to humid air pasteurization conditions of 170°F. d.b./150°F. w.b. for 10 minutes and finish dried at 130°F. to a moisture content of less than 4%. Control product, also taken from the third stage, was finished dried at 130°F.

Bacteria results were:

|  | Humid Air Treated | Control |
|---|---|---|
| Standard Plate Count/gram | 4,000 | 200,000 |
| Coliform/gram | <40 | 320 |

EXAMPLE V

Fresh head celery was washed, trimmed and the stalk portion sliced transversely ⅛ inch. The celery slices were treated in a dilute sulfite solution and dried in a continuous belt dryer at temperatures ranging from 180°F. to 150°F. reaching an average moisture content of about 25%. The material was exposed to humid air pasteurization conditions of 170°F. d.b./150°F. w.b. for 4 minutes and then finish dried to less than 4% moisture content at temperatures ranging from 140°F. to 110°F. The moisture level of the product out of the humid air treatment zone averaged 13%.

Bacteria results for a series of samples before and after treatment are summarized below:

| Standard Plate Count/gram | | Coliform/gram | | E. coli | |
|---|---|---|---|---|---|
| Before Treatment | After Treatment | Before Treatment | After Treatment | Before Treatment | After Treatment |
| 220,000 | 34,000 | 3,000 | <40 | + | – |
| 91,000 | 18,000 | 7,000 | <40 | – | – |
| 770,000 | 13,000 | 23,000 | <40 | + | – |
| 440,000 | 7,000 | 20,000 | <40 | + | – |
| 680,000 | 10,000 | 44,000 | <40 | – | – |
| 662,000 | 20,000 | 21,000 | <40 | + | – |

EXAMPLE VI

Green onions were washed, trimmed sliced into ⅛ inch segments, treated in a dilute sulfite solution and dried in a belt dryer at temperatures ranging from 190°F. to 150°F. The partially dehydrated onions were divided into four parts and exposed to different humid air conditions for 10 minutes after which all samples were finish dried at 130°F. to less than 4% moisture content.

Bacteria results before and after treatment are summarized below:

| Humid Air Treatment Conditions | Standard Plate Count/gram | | Coliform/gram | |
|---|---|---|---|---|
|  | Before Treatment | After Treatment | Before Treatment | After Treatment |
| 170°F. d.b./150°F. w.b. | 1,050,000 | 1,000 | 80 | <40 |
| 160°F. d.b./140°F. w.b. | 77,000 | 2,000 | <40 | <40 |
| 150°F. d.b./130°F. w.b. | 34,000 | 7,000 | <40 | <40 |
| 140°F. d.b./120°F. w.b. | 68,000 | 15,000 | 40 | <40 |

From the foregoing, it is seen that markedly lower bacteria counts are found in products which have been treated according to the process of this invention. A reduction of other microorganisms in the products has also been observed. However, it has been found that these improvements in the wholesomeness of the dehydrated vegetable products have been achieved without noticeably impairing quality features such as color, flavor and texture and ease of rehydration; without substantial capital outlays for additional equipment, preservatives, and the like; and without significantly increasing overall processing times.

While the present invention has been described by reference to certain preferred embodiments and specific examples, it is intended to be limited only by the scope of the appended claims.

We claim:

1. A process of preparing dehydrated vegetables which are substantially free of microbiological contamination and have quality attributes of color, flavor, texture, and ease of rehydration which comprises subjecting vegetables to partial dehydration with hot air at a temperature of from about 130°F. to about 250°F. to a moisture content less than about 30%; contacting the partially dehydrated vegetables with a hot humid gaseous medium not exceeding 180°F. wet bulb temperature ranging from about 200°F. d.b./180°F. w.b. to about 140°F. d.b./120°F. w.b. and maintained at a moisture level sufficient to realize bacteria kill for a time period less than 12 minutes and at a temperature sufficient to reduce microbiological contamination but insufficient to cause heat damage to the product under wet and dry bulb thermometry control which avoid evaporative cooling or condensation during said contact, the partially dried product temperature being thereby increased to 140°F. or above and to the circulating air wet bulb temperature or higher and any product moisture reduction (expressed as a weight percent of the product before and after said decontamination) ranging between 0–12%, and subjecting the thusly contacted partially dehydrated vegetables to dehydration with less humid hot air at a dry bulb temperature of from about 110°F. to about 160°F. to a moisture content of less than about 8%.

2. A process as in claim 1 in which said dry bulb/wet bulb temperatures are from about 170°F. d.b./150°F. w.b. to about 150°F. d.b./130°F. w.b.

3. A process as in claim 1 in which the partially dehydrated vegetables are contacted with said air for a period of from about 3 to about 12 minutes.

4. A process as in claim 3 in which said period is from about 5 to about 12 minutes.

5. A process as in claim 4 in which the partially dehydrated vegetables have a moisture content of at least about 10%.

6. A process of preparing dehydrated vegetables which are substantially free of microbiological contamination and have quality attributes of color, flavor, texture and ease of rehydration which comprises subjecting vegetables to partial dehydration with hot air at a temperature of from about 130°F. to about 250°F. to a moisture content of from about 8 to about 30%; contacting the partially dehydrated vegetables with a hot, humid, drying gaseous medium at a wet bulb temperature less than 180°F. ranging from about 200°F. d.b./180°F. w.b. to about 140°F. d.b./120°F. w.b. to raise the temperature of said partially dehydrated vegetables to a temperature of at least about 140°F. and for a time period less than 12 minutes but sufficient to reduce microbiological contamination under controlled conditions which avoid evaporative cooling or condensation and insufficient to cause heat damaging the product, the partially dried product temperature being thereby increased to the circulating air wet bulb temperature or higher and any product moisture reduction (expressed as a weight percent of the product before and after said decontamination) ranging between 0–12% and subjecting the thusly contacted partially dehydrated vegetables to dehydration with lower humidity hot air at lower wet bulb temperatures and a dry bulb temperature of from about 110°F. to about 160°F. to a moisture content of less than about 8%.

7. A process as in claim 6 in which said temperature is from about 140°F. to about 170°F. and said hot humid drying medium is air having dry bulb/web bulb temperatures of from about 200°F. d.b./180°F. w.b. to about 140°F. d.b./120°F. w.b.

8. A process as in claim 1 in which the thus contacted partially dehydrated vegetables are immediately subjected to drying with low humidity drying air having a wet bulb temperature of less than about 125°F. to effect rapid cooling.

9. A process as in claim 1 in which said vegetables are in the form of pieces.

10. A process as in claim 8 in which said vegetables are celery.

11. A process as in claim 8 in which said vegetables are bell peppers.

12. A process as in claim 8 in which said vegetables are green beans.

13. A process as in claim 8 in which said vegetables are spinach.

14. A process as in claim 8 in which said vegetables are onions.

* * * * *